United States Patent
Sharma et al.

(10) Patent No.: US 10,489,180 B2
(45) Date of Patent: Nov. 26, 2019

(54) DETERMINING VIRTUAL NETWORK FUNCTION CONFIGURATIONS

(71) Applicant: HEWLETT PACKARD ENTERPRISE DEVELOPMENT LP, Houston, TX (US)

(72) Inventors: Puneet Sharma, Palo Alto, CA (US); Lianjie Cao, Palo Alto, CA (US); Vinay Saxena, Plano, TX (US); Vasu Sasikanth Sankhavaram, Sunnyvale, CA (US); Badrinath Natarajan, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 116 days.

(21) Appl. No.: 15/339,574

(22) Filed: Oct. 31, 2016

(65) Prior Publication Data
US 2018/0121222 A1 May 3, 2018

(51) Int. Cl.
*G06F 9/46* (2006.01)
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01);
(Continued)

(58) Field of Classification Search
CPC ....... G06F 9/45558; G06F 2009/45562; G06F 2009/4557; G06F 2009/45595
See application file for complete search history.

(56) References Cited

U.S. PATENT DOCUMENTS

| | | | |
|---|---|---|---|
| 8,402,437 B2 * | 3/2013 | Dhanakshirur | G06F 9/44505 717/121 |
| 8,713,139 B1 * | 4/2014 | Kasper | H04L 61/2038 709/221 |

(Continued)

OTHER PUBLICATIONS

"Lianjie Cao, Puneet Sharma, NFV-Vital: A framework for characterizing the performance of virtual network functions,2015, pp. 93-99" (Year: 2015).*

(Continued)

*Primary Examiner* — Camquy Truong
(74) *Attorney, Agent, or Firm* — Hewlett Packard Enterprise Patent Department

(57) ABSTRACT

Examples relate to determining virtual network function configurations. In one example, a computing device may receive a virtual network function specifying a particular function to be performed by at least one virtual machine; identify a particular performance metric for the virtual network function; determine, using the particular performance metric and a default resource configuration, a first infrastructure configuration specifying a value for each of a plurality of infrastructure options, each of the plurality of infrastructure options specifying a feature of the at least one virtual machine; and determine, using the particular performance metric and the first infrastructure configuration, a first resource configuration specifying a value for each of a plurality of virtualized hardware resources for the at least one virtual machine.

19 Claims, 4 Drawing Sheets

(52) U.S. Cl.
CPC .............. *G06F 2009/45562* (2013.01); *G06F 2009/45595* (2013.01)

(56) References Cited

U.S. PATENT DOCUMENTS

| | | | |
|---|---|---|---|
| 9,003,406 B1* | 4/2015 | Hodge | G06F 8/60 717/176 |
| 9,052,938 B1* | 6/2015 | Bhide | G06F 9/45533 |
| 9,436,443 B2 | 9/2016 | Chiosi et al. | |
| 9,460,286 B1 | 10/2016 | Felstaine et al. | |
| 9,594,649 B2* | 3/2017 | Yang | G06F 11/202 |
| 2015/0358248 A1 | 12/2015 | Saha et al. | |

OTHER PUBLICATIONS

Asawa, M., "NFV: a Dynamic, Multi-layer Resource Optimization Challenge," 2012, 38 pages.

McGrath, M. J., "Infrastructure Virtualisation," Apr. 30, 2016, 96 pages.

Riccobene, V. et al., "Automated Generation of VNF Deployment Rules Using Infrastructure Affinity Characterization," 2016, 8 pages.

Wang et al., "The Impact of Virtualization on Network Performance of Amazon EC2 Data Center," in Infocom '10. IEEE, 2010, pp. 1163-1171.

Sekar et al., "Design and implementation of a consolidated middlebox architecture," in NSDI '12. USENIX, 2012, pp. 24-24.

Martins et al., "ClickOS and the art of network function virtualization," in NSDI '14. USENIX, 2014, pp. 459473.

Liu et al., "Evaluating standard-based self-virtualizing devices: a performance study on 10 GbE NICs with SR-IOV support," in IPDPS '10. IEEE, 2010, pp: 1-12.

High Performance, Open Standard Virtualization With NFV and SDC, http://www.intel.com/content/dam/www/public/us/en/documents/white-papers/communications-virtualization-snd-nfv-paper.pdf.

Gember-Jacobson et al., "OpenNF: Enabling Innovation in Network Function Control," in SIGCOMM '14. ACM, 2014, pp. 163-174.

Gember et al., "Toward Software-Defined Middlebox Networking," in HotNets-XI. ACM, 2012, pp. 7-12.

Gember et al., "Stratos: A Network-Aware Orchestration Layer for Virtual Middleboxes in Clouds," Technical Report arXiv:1305_0209, 2013, 14 pages.

Dobrescu et al., "Toward Predictable Performance in Software Packet-Processing Plafforms," in NSDI '12. USENIX, 2012, pp. 11-11.

Cao et al., "NFV-Vital: A Framework for Characterizing the Performance of Virtual Network Functions," in IEEE NFV-SDN 2015.

Anwer et al., "A Slick Control Plane for Network Middleboxes," in HotSDN '13. ACM, 2013, pp. 147-148.

Anderson et al., "Performance Considerations of Network Functions Virtualization using Containers," in ICNC '16. IEEE, 2016, 20 pages.

* cited by examiner

DETERMINING VIRTUAL NETWORK FUNCTION CONFIGURATIONS

BACKGROUND

Virtual network functions are designed to perform a variety of computer network services on virtualized hardware as opposed to using dedicated hardware devices. Virtual network functions are often performed by one or more virtual machines that make use of shared hardware resources that are specifically provisioned for a particular function. The virtual machines used to perform virtual network functions may vary in their configuration, and the configurations may depend on a variety of factors.

BRIEF DESCRIPTION OF THE DRAWINGS

The following detailed description references the drawings, wherein.

DETAILED DESCRIPTION

Figure 1:
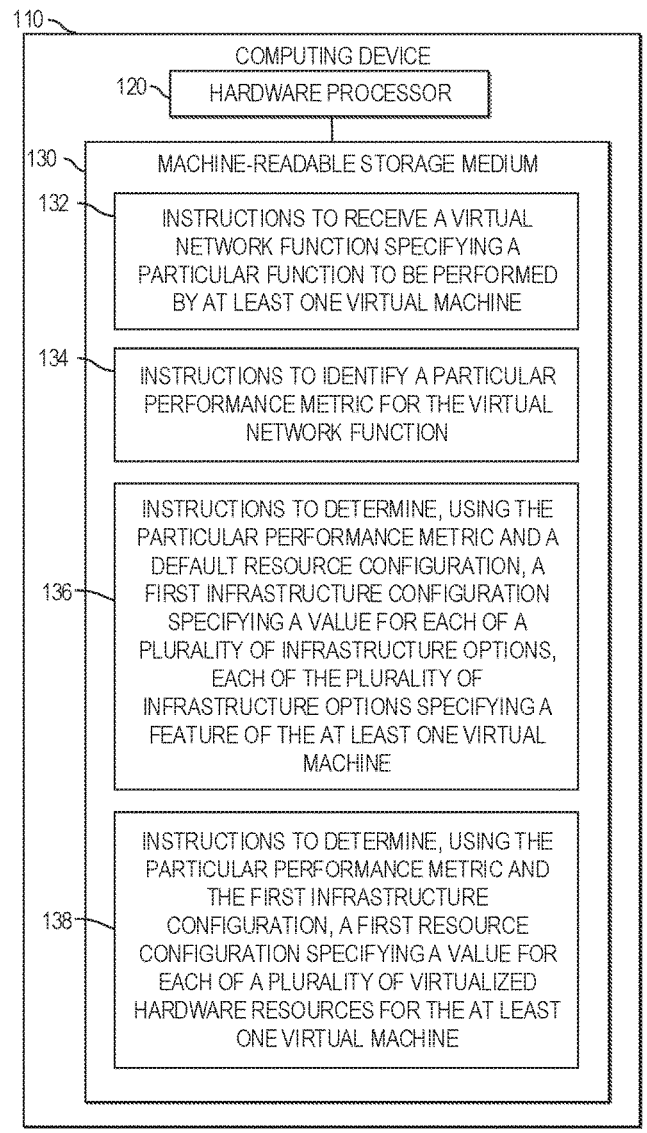
FIG. 1 is a block diagram of an example computing device for determining virtual network function configurations.

The flexibility of virtual machines (VMs) offers a variety of options and potential configurations that may be used to implement virtual network functions (VNFs). The configuration of one or more virtual machines for performing a particular VNF may depend on a variety of things, such as available hardware/software or performance preferences and constraints. Generally, virtual machine configuration options may be categorized into one of two types, infrastructure configuration options/parameters and resource configuration options/parameters. Different infrastructure configurations may have different impacts on the performance of different VNFs. The number of infrastructure configuration options depends on the underlying hardware infrastructure used to deploy/instantiate a particular VNF. Examples of infrastructure configuration options include SR-IOV, CPU-pinning etc. The resource configuration options are generally related to amount/size of resources allocated to a particular instantiation of VNF. Examples of resource configurations include number of virtual CPUs (vCPU), size of memory, etc.

To identify an infrastructure configuration that specifies which software and hardware features are to be used/enabled for virtual machines that perform a particular VNF, a device may iterate through various infrastructure configurations using a default resource configuration to identify an infrastructure configuration that meets certain performance thresholds and/or demonstrates improvement in performance. Similarly, a resource configuration that specifies the virtualized hardware resources to be used for performing a particular VNF may be identified by iterating through various resource configurations using the previously identified infrastructure configuration. The identified infrastructure and resource configurations may be associated with the particular VNF, in a manner designed to ensure that future deployments of the VNF use the identified infrastructure and resource configurations.

By way of example, a VNF may be used to implement a firewall for an enterprise network of computing devices, allowing one or more virtual machines to handle the functions of a firewall for the network, such as scanning and blocking network traffic and providing various intrusion notifications. A VNF configuration manager, or NFV orchestrator, may use performance data to identify a configuration for the virtual machine(s) performing the firewall function. For example, service level agreements (SLAs), user input, and/or historical data may be used to indicate that the firewall function should be capable of handling 1 Gbps of network traffic. Given a set of test data, such as previously recorded network traffic, the VNF configuration manager may test various configurations to determine the manner in which virtual machines should be deployed to perform the firewall function.

The VNF configuration manager may, for example, determine a particular infrastructure configuration by testing various infrastructure options using the set of test data and a default resource configuration. Infrastructure options include, for example, virtualization technologies, including hardware and/or software features, which may be utilized for a particular virtual machine deployment. E.g., the infrastructure options may allow the selection of technologies such as single root I/O virtualization (SR-IOV), Intel VT-d, Data Plane Development Kit (DPDK), Open vSwitch, non-uniform memory access (NUMA), Virtual Extensible LAN (VXLAN), Network Virtualization using Generic Routing Encapsulation (NVGRE), and other technology options associated with virtual machine infrastructure. The VNF configuration manager may deploy virtual machines using the same virtualized hardware, run tests with the same test data, and change infrastructure options to determine which infrastructure configuration meets certain performance thresholds, or which infrastructure configuration performs the fastest, for example.

After identifying a particular infrastructure configuration for the firewall VNF, the VNF configuration manager may perform similar steps to identify a virtual resource configuration for the firewall VNF. The virtual resource configuration may include options such as the number of virtual machines, number of data processors, speed of data processors, an amount of memory, and/or an amount of data storage. The VNF configuration manager may iteratively test deployments of one or more virtual machines with different resource configurations using the test data and the previously identified infrastructure configuration. The test results may be used to identify which resource configuration meets the performance thresholds or other criteria, such as which resource configuration performs faster than others, or which uses the least hardware resources, for example.

The manner in which the VNF configuration manager iterates through various configurations may vary. Details describing ways in which the various configurations may be altered and tested are described in further detail in the paragraphs that follow. Upon identifying an infrastructure configuration and resource configuration for a particular VNF, the resulting configurations may be associated with the particular VNF, e.g., in a database, to facilitate future deployments of the particular VNF without the need to manually configure or retest other configurations. In some implementations, the configurations may also be applied to other VNFs. For example, an intrusion detection system often operates in a manner similar to that of a firewall, e.g., scanning network traffic for various network anomalies, and the configuration of the firewall VNF may be used for deploying an intrusion detection VNF. Configurations may be periodically updated and/or updated in response to various events. For example, when new infrastructure options or virtualized hardware resources are added, or existing options or resources are removed, the VNF configuration manager may identify new configurations to use. Further details regarding the determination of virtual network function configurations are described in the paragraphs that follow.

Referring now to the drawings, FIG. 1 is a block diagram 100 of an example computing device 110 for determining virtual network function configurations. Computing device 110 may be, for example, a personal computer, a server computer, cluster of computers, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-138, to control processes for determining virtual network function configurations. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions 132-138, for determining virtual network function configurations.

As shown in FIG. 1, the hardware processor 120 executes instructions 132 to receive a virtual network function specifying a particular function to be performed by at least one virtual machine. Virtual network functions may include, for example, a network firewall function, a network load balancing function, a network intrusion detection and/or prevention function, or a data center network function, to name a few. The VNF may be provided by or retrieved from a separate device or a user. By way of example, a user may provide input specifying a network load balancing VNF, which is to be performed by a virtual machine deployed in a cloud computing system that utilizes hardware virtualization.

The hardware processor 120 executes instructions 134 to identify a particular performance metric for the virtual network function. A VNF performance metric provides a benchmark, or threshold, for evaluating VNF performance. In some implementations, more than one performance metric may be identified. The performance metric or metrics used may vary, and example performance metrics include a bandwidth metric, a throughput metric, a latency metric, an availability time or up-time metric, a time metric, a data storage metric, or any other metric useful for evaluating the performance of VNFs. The performance metric may be based on historical performance data for the network functions, default performance measures, service level agreement values, and/or user input. By way of example, the user that provided the network load balancing VNF may also provide a latency metric specifying a threshold for average latency for network traffic being processed by the network load balancing VNF.

The hardware processor 120 executes instructions 136 to determine, using the particular performance metric and a default resource configuration, a first infrastructure configuration specifying a value for each of a plurality of infrastructure options, each of the plurality of infrastructure options specifying a feature of the at least one virtual machine. The default resource configuration is a virtualized hardware configuration for one or more virtual machines that may be used to test various infrastructure configurations, e.g., the default resource configuration may specify one virtual machine having one virtual CPU running on one quad-core processor with 2 GB of RAM and 5 GB of data storage space. The manner in which the first infrastructure configuration is determined may vary.

In some implementations, the first infrastructure configuration is determined by iteratively adjusting and testing the infrastructure options using a test data set and the default resource configuration. For example, a test data set may be provided as input to a load balancing VNF that was configured using the default resource configuration and a default infrastructure configuration. The default infrastructure configuration may be periodically adjusted, e.g, based on the performance results of the VNF. For example, in a situation with five independent infrastructure options for the load balancing VNF, the computing device 110 may iterate through each potential infrastructure configuration, running test data through a virtual machine used to implement the load balancing VNF. Results of the tests, such as average latency for processing the test data set, may be used to compare the different infrastructure configurations to one another, e.g., in a manner designed to find the infrastructure configuration with the lowest latency.

Various techniques may be used to iterate through infrastructure configurations. In the above example, five independent infrastructure options that are either enabled or disabled may result in $2^5$ different infrastructure configurations. The computing device may identify redundancies and dependencies between infrastructure options that reduce the number of infrastructure configurations to test, e.g., different versions of a similar technology may not be enabled at the same time or two options that are known to work well together may always be enabled together. The computing device 110 may also use performance as a factor in performing iterative testing to reduce iterations, e.g., by identifying and prioritizing infrastructure options with relatively higher performance impact while ignoring infrastructure options with relatively lower performance impact. In some implementations, fractional factorial design may also be used to reduce the number of infrastructure configurations to test. Infrastructure options, in some implementations, are not binary, which may result in more than $2^N$ different infrastructure configurations to test. In some implementations, iterative testing may be performed and evaluated using a particular framework, such as the Network Function Virtualization (NFV) Virtualization Impact on Throughput and Load (VITAL) framework.

The hardware processor 120 executes instructions 138 to determine, using the particular performance metric and the first infrastructure configuration, a first resource configuration specifying a value for each of a plurality of virtualized hardware resources for the at least one virtual machine. The virtualized hardware resources may include a variety of hardware resources to be allocated for performing the particular VNF, such as a number of virtual machines, a number of data processors, a speed of the data processors, an amount of memory, a speed of the memory, and data storage space available, to name a few. The manner in which the first resource configuration is determined may vary.

In some implementations, the first resource configuration is determined by iteratively adjusting and testing the resource options using a test data set and the first infrastructure configuration. For example, as with the infrastructure options, the test data set may be provided to the load balancing VNF that was configured to use the first infrastructure configuration and a default resource configuration. The default resource configuration may be adjusted after each iteration based on results of the performance of the VNF. For example, a load balancing VNF that performed on the test data with relatively high latency may result in the resource configuration to be adjusted to increase processor and/or memory resources allocated to the virtual machine(s) for performing the load balancing VNF. Iterative adjustments and testing may be performed in a manner designed to identify a resource configuration that performs better than other resource configurations for that VNF and/or a resource configuration that uses less resources than other configurations while still meeting one or more performance metrics, such as SLAs.

Many different values may be available for each of virtualized hardware resources that comprise the resource configuration. For example, there may be many options for varying the number of virtual machines, processors, and/or processor cores, or for varying the values for processor speeds, memory capacity, memory speed, and/or data storage capacity. In some implementations, a resource configuration may be adjusted by determining that the results of the performance of the VNF indicate that a particular virtualized hardware resource met a threshold measure of utilization, and adjusting that particular virtualized hardware resource in response to that determination. For example, for a particular test of the load balancing VNF, the virtual machine used in the test may experience an average of 95% CPU utilization. In a situation with an example threshold of 90% average CPU utilization, the computing device 110 may adjust the resource configuration, e.g., by adding CPUs and/or cores, or increasing CPU clock speeds, to determine another resource configuration for the next iteration of testing the load balancing VNF.

Variations on the foregoing method for iterative resource configuration adjustment may be used, e.g., providing for a process of iteratively testing various virtualized hardware configurations and adjusting the virtualized hardware based on over or under-utilization. In another example, a resource configuration may be tested by gradually increasing the workload of a VNF to identify a bottleneck experienced by one of the particular virtualized hardware resources. This process may also be performed iteratively, increasing one or more virtualized hardware resources each time a bottleneck occurs. The process may continue, for example, until a threshold virtualized hardware resource value is reached, such as a threshold for available virtualized hardware resources and/or a SLA threshold being met. As noted above, using a particular NFV framework, such as NFV VITAL, may provide additional options for performing iterative testing and adjustments on virtual machine configurations.

In some implementations, multiple performance metrics may be used to determine infrastructure and resource configurations. In this situation, the performance associated with one SLA may be extrapolated to other SLAs. This may be accomplished, for example, by using regression analysis on the tested configurations and their corresponding performance results collected as a result of the tests.

In some implementations, virtual network functions may be single component VNFs or multi-component VNFs. A single component VNF is a VNF that may be implemented in one or multiple threads of the same system. A single component VNF may be scaled by increasing the virtualized hardware resources of the virtual machine performing the VNF, and/or by deploying additional virtual machines of the same type. A multi-component VNF includes multiple components, each of which may be scaled separately from the other components of the VNF. Each component of a multi-component VNF may have its own infrastructure and resource configurations. The separate configurations may be determined for a multi-component VNF in parallel or one at a time, in either situation using processes such as the iterative determination processes described above.

In some implementations, the hardware processor 120 may execute instructions to store data indicating an association between the virtual network function, the first infrastructure configuration, and the first resource configuration. The data may be stored in the machine readable storage medium 130 or in a separate storage device. The stored data may be used when deploying the particular VNF. For example, after determining an infrastructure configuration and resource configuration for the load balancing VNF, a later deployment of the same load balancing VNF or another load balancing VNF may use the stored configurations associated with the load balancing VNF to deploy virtual machines that will implement the load balancing VNF.

In some implementations, the identified configurations for a particular VNF may be used for determining configurations for one or more other VNFs. For example, the hardware processor 120 may execute instructions to store, in a second data storage device, data indicating an association between the first infrastructure configuration, the first resource configuration, and a second virtual network function that is different from the virtual network function. For example, the hardware resources specified by the resource configuration may be scaled when deploying a load balancer VNF with higher or lower associated performance metrics, e.g., a higher throughput or latency SLA. In some implementations, the identified configurations may be associated with and/or used for different types of VNFs, e.g., the configurations determined for the load balancer VNF may be used to deploy a firewall VNF. When using previously determined configurations for other VNFs, in some implementations the previously determined configurations may be used as a starting point, or default, for iteratively determining a new infrastructure and/or resource configuration.

Figure 2:
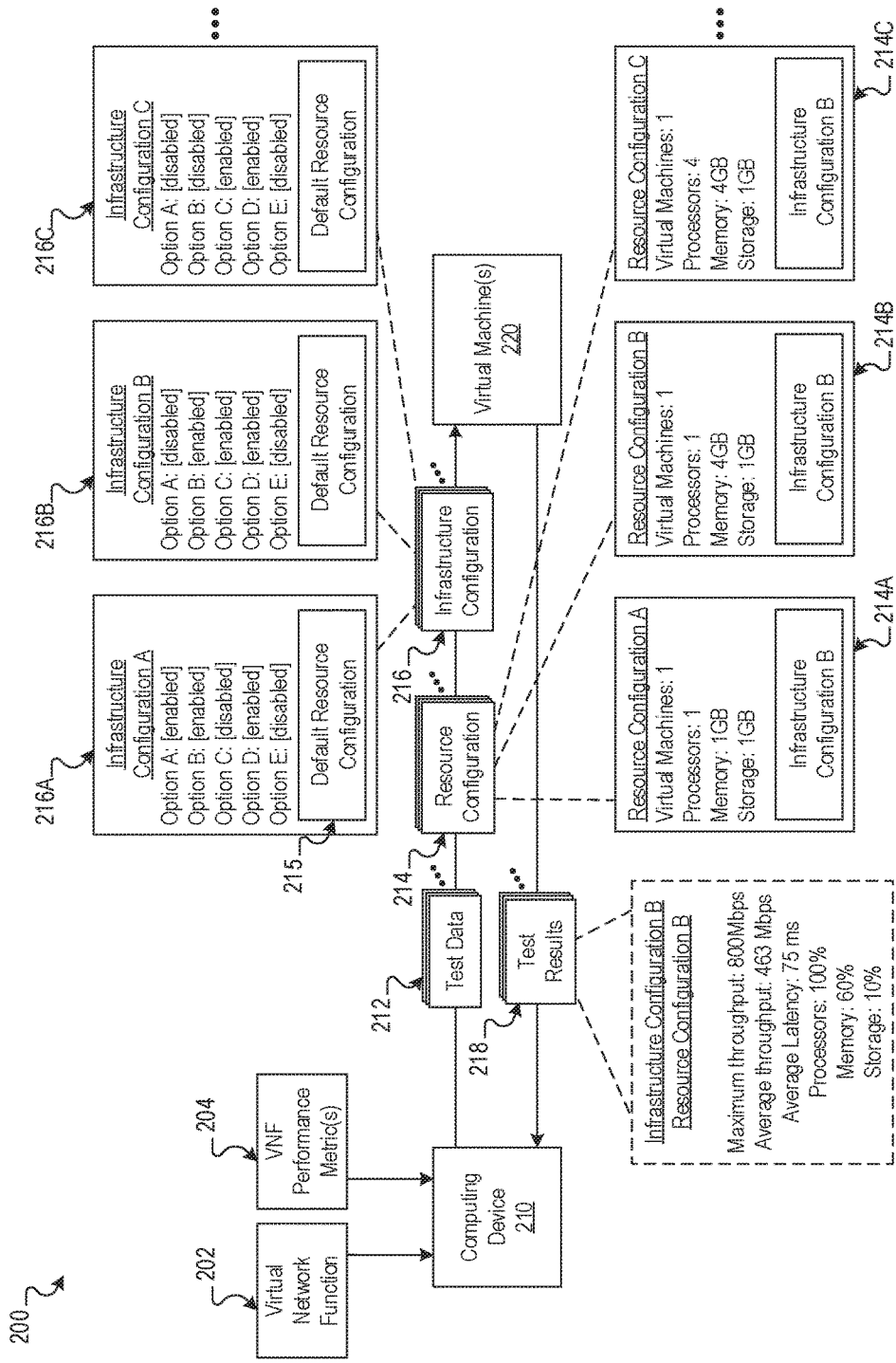
FIG. 2 is an example data flow depicting the determination of virtual network function configurations.

FIG. 2 is an example data flow 200 depicting the determination of virtual network function configurations. The example data flow 200 includes a computing device 210, and virtual machine(s) 220. The computing device 210 may be the same as or similar to the computing device 110 of FIG. 1. The computing device 210 may be any computing device capable of testing and deploying the virtual machine(s) 220, such as a server computer or personal computer. While the example data flow 200 depicts only two types of devices, the depicted devices may operate in an environment with or in communication with many other devices. For example, the virtual machine(s) 220 are deployed on underlying hardware, which is not depicted. In a cloud computing environment, many other devices may communicate with the computing device 210 and/or the virtual machine(s) 220.

During operation, the computing device 210 receives a virtual network function 202 and one or more VNF performance metrics 204. The VNF 202 and the VNF performance metrics 204 may be received from a database, from user input, or from any other source. The VNF 202 is a function that is to be implemented by the virtual machine(s) 220 for a specific purpose. By way of example, the VNF 202 may be a network intrusion detection system (NIDS) that is designed to protect a network of computing devices from intrusions. The VNF performance metric(s) 204 are performance metrics that may be used to benchmark various VNF configurations. The VNF performance metrics 204 may include, for example, SLA information that specifies latency as a performance metric, maximum virtualized hardware resources to dedicate to the VNF, and/or a maximum latency for network traffic passing through the NIDS VNF.

The computing device 210 is designed to iteratively test various infrastructure configurations and resource configurations for the virtual machine(s) 220 that implement the VNF 202. The iterative testing may be performed in a manner designed to determine configurations that meet or exceed the performance metrics 204. In the example data flow 200, the computing device is depicted as iteratively determining and providing different resource configurations 214 and infrastructure configurations 216 for the deployment of the virtual machine(s) 220. The computing device 210 also provides test data 212 for testing the virtual machine(s) 220.

The example data flow 200 depicts three different infrastructure configurations, 216A, 216B, and 216C, though more infrastructure configurations 216 may be tested. Each example infrastructure configuration includes a default resource configuration 215 that specifies default virtualized hardware resource allocation for the virtual machine(s) 220. For example, the default resource configuration 215 may specify that each infrastructure configuration 216 is to be tested on one virtual machine that includes 1 processor, 1 GB of memory, and 1 GB of data storage. Each example infrastructure configuration 216 depicts multiple infrastructure options and their status for each iteration, e.g., enabled or disabled. For example, infrastructure configuration A 216A depicts three enabled infrastructure options (A, B, and D) and two disabled options (C and E).

After deploying the virtual machine (s) 220 using an infrastructure configuration 216, the computing device 210 provides test data 212 to be handled by the virtual machine(s) 220 that implement the VNF 202. Test data 212 may be user or computer generated, or may be based on historical data, such as recorded network traffic for a network. The test results 218 indicate the performance of the VNF as performed during the current iteration, which may include hardware utilization data as well as performance metrics such as maximum throughput and average latency. Using the NIDS VNF example, the test data 212 may be provided to the virtual machine(s) 220 as a replay of historical data. The virtual machine(s) 220 execute the NIDS VNF on the test data 212, and the test results 218 are provided to the computing device 210.

After testing various infrastructure configurations 216, the computing device 210 determines one infrastructure configuration to use for the VNF 202. The choice may depend, for example, on the performance metrics 204 and the test results 218 of each iteration through the various infrastructure configurations 216. By way of example, the computing device 210 may determine that infrastructure configuration B 216B should be used for the NIDS VNF, e.g., based on the test results 218 returned when infrastructure configuration B 216B was used to deploy the virtual machine(s) 220. A variety of methods may be used to iteratively test various infrastructure configurations, such as testing each potential configuration or using fractional factorial design to test a subset of the potential configurations.

In the example data flow 200, after determining the infrastructure configuration to be used for the VNF 202, the computing device 210 determines a resource configuration for the VNF 202 in a manner similar to the way it determined the infrastructure configuration, e.g., by iterating through various resource configurations 214 and testing each one. The manner in which the resource configurations 214 are adjusted after each iteration may vary from the manner in which the infrastructure configurations 216 were adjusted. In some implementations, virtualized hardware resource utilization may be used to determine what adjustments are to be made to resource configurations.

In the example data flow 200, the test results 212 for infrastructure configuration B 216B and resource configuration B 214B are depicted. The results 212 show various performance metrics related to how the VNF performed using those configurations. The example test results 212 also depict virtualized hardware utilization, and show that processor utilization reached 100% during the test of infrastructure configuration B 216B and resource configuration B 214B. In the example data flow, the computing device 210 uses that test data 212 and processor utilization threshold to increase the number of processors to be used in the next iteration. In resource configuration C 214C, for example, the virtual processors allocated for the virtual machine(s) 220 deployment increased from 1 processor to 4, e.g., in a manner designed to ensure that the processor in this configuration does not become a bottleneck for performance.

Upon determining a combination of configurations, both infrastructure and resource, that meet or exceed the performance metrics 204, the computing device 210 may associate the VNF 202 with the determined configurations. The association may be stored in a data storage device for later use in deployment of the VNF or be provided as output to a user or another device.

While the example data flow 200 depicts one example of determining virtual network function configurations, many variations of the process and systems for performing the process exist. For example, as described above with respect to FIG. 1, some VNFs are multi-component, which may result in separately determined infrastructure and resource configurations for each component of the VNF. The infrastructure options and virtualized hardware resource options may vary, as may the number of iterations performed for each configuration. In addition, the manner in which adjustments are made to the configurations for each iteration and the manner in which performance is used to determine configurations and adjustments may vary.

Figure 3:
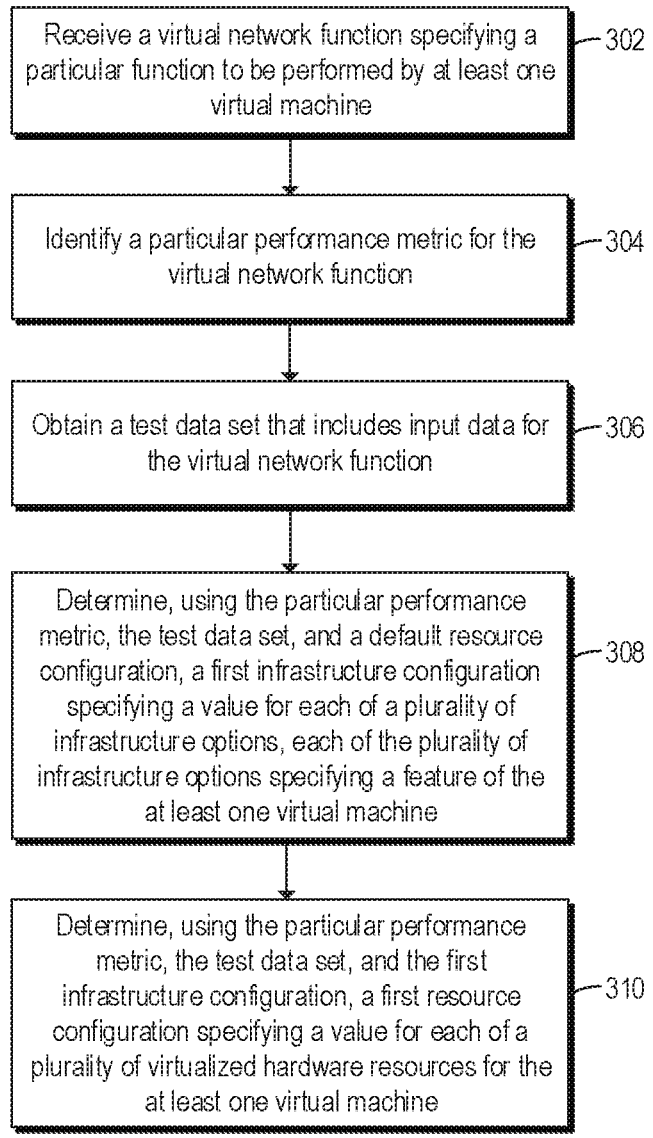
FIG. 3 is a flowchart of an example method for determining virtual network function configurations.

FIG. 3 is a flowchart of an example method 300 for determining virtual network function configurations. The method 300 may be performed by a computing device, such as a computing device described in FIG. 1. Other computing devices may also be used to execute method 300. Method 300 may be implemented in the form of executable instructions stored on a machine-readable storage medium, such as the storage medium 130, and/or in the form of electronic circuitry, such as an FPGA or ASIC.

A virtual network function is received specifying a particular function to be performed by at least one virtual machine (302). For example, data specifying a data center VNF to be deployed on virtual machines in a cloud computing environment may be received.

A particular performance metric is identified for the virtual network function (304). Average throughput, for example, may be chosen as a performance metric for the data center VNF. In some implementations additional performance metrics may be used, e.g., average or maximum latency.

A test data set is obtained that includes input data for the virtual network function (306). The test data may be obtained in a variety of ways. For example, historical data previously processed by data centers, virtualized or otherwise, may be recorded and used as test data. As another example, test data may be created by a user or by a machine.

Using the particular performance metric, the test data set, and a default resource configuration, a first infrastructure configuration is determined specifying a value for each of a plurality of infrastructure options, each of the plurality of infrastructure options specifying a feature of the at least one virtual machine (308). The default resource configuration may specify an amount of different virtualized hardware resources to be used when determining an infrastructure configuration for the VNF. The virtualized hardware resources used may be the same across any number of infrastructure configurations being evaluated. In some implementations, the first infrastructure configuration is determined by iteratively adjusting and testing the infrastructure options using the test data set and the default resource configuration for the at least one virtual machine. Each infrastructure option is an option allowing a particular technology to be used when deploying a virtual machine or when the virtual machine is performing the VNF. As noted above, different infrastructure options may affect performance of various VNFs in different ways. Using the data center VNF example and the maximum throughput performance metric, infrastructure options may be iteratively adjusted and tested using the same virtualized hardware resources, and the test results may indicate which infrastructure configuration results in the highest maximum throughput.

Using the particular performance metric, the test data set, and the first infrastructure configuration, a first resource configuration is determined specifying a value for each of a plurality of virtualized hardware resources for the at least one virtual machine (310). A variety of virtualized hardware resources may be specified by a resource configuration, such as a number of virtual machines, number of processors, amount of memory, and amount of data storage. The first resource configuration may be determined in a manner similar to the infrastructure configuration, e.g., iteratively adjusting and testing the resource options using the test data set and the first infrastructure configuration for the at least one virtual machine.

In some implementations, the resource configuration may be determined by using the test data set to perform the VNF on a test virtual machine using the first infrastructure configuration and a default resource configuration, and then adjusting the default resource configuration based on results of the performance of the VNF. The default resource configuration may be adjusted by determining that the results of performing the virtual network function indicate that a particular hardware resource met a threshold measure of utilization and adjusting the particular hardware resource in response to the determination. By way of example, the data center VNF may be tested using the first infrastructure configuration and a default resource configuration. In a situation where the memory utilization exceeds a threshold measure of memory utilization, e.g., 80% utilization, the resource configuration may be adjusted by increasing the amount of virtual memory to be allocated to the virtual machine(s) performing the data center VNF. The thresholds may be predetermined, e.g., based on user input, historical performance, or included in the particular performance metrics.

In some implementations the method 300 may include storing, in a data storage device such as a non-transitory computer readable medium, data indicating an association between the virtual network function, the first infrastructure configuration, and the first resource configuration. For example, after determining infrastructure and resource configurations for a VNF, the configurations may be stored so they can be used for future deployments of the VNF, or for use in determining configurations for other VNFs.

Figure 4:
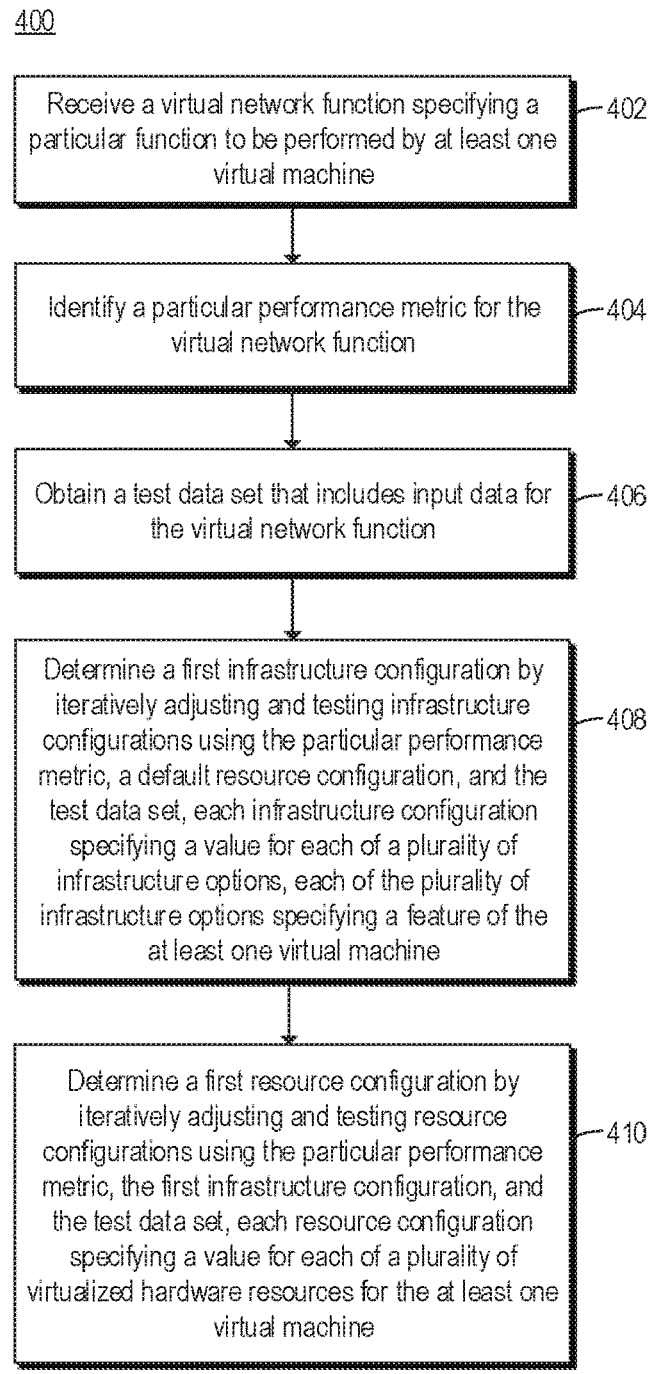
FIG. 4 is a flowchart of an example method for the determination of virtual network function configurations.

FIG. 4 is a flowchart of an example method 400 for the determination of virtual network function configurations. The method 400 may be performed by a computing device, such as a computing device described in FIG. 1. Other computing devices may also be used to execute method 400. Method 400 may be implemented in the form of executable instructions stored on a machine-readable storage medium, such as the storage medium 130, and/or in the form of electronic circuitry, such as an FPGA or ASIC.

A virtual network function is received specifying a particular function to be performed by at least one virtual machine (402). This may be performed in manner similar to that of 302 of method 300, above.

A particular performance metric is identified for the virtual network function (404). This may be performed in manner similar to that of 304 of method 300, above.

A test data set is obtained that includes input data for the virtual network function (406). This may be performed in manner similar to that of 306 of method 300, above.

Determine a first infrastructure configuration by iteratively adjusting and testing infrastructure configurations using the particular performance metric, a default resource configuration, and the test data set, each infrastructure configuration specifying a value for each of a plurality of infrastructure options, each of the plurality of infrastructure options specifying a feature of the at least one virtual machine (408). For example, and as described above, a default resource configuration may be used to iterate through various infrastructure options for a virtual machine deployment for implementing the virtual network function, e.g., in a manner designed to determine an infrastructure configuration that meets certain performance metrics' threshold.

Determine a first resource configuration by iteratively adjusting and testing resource configurations using the particular performance metric, the first infrastructure configuration, and the test data set, each resource configuration specifying a value for each of a plurality of hardware resources for the at least one virtual machine (410). For example, and as described above, the first infrastructure configuration may be used to iterate through various hardware options for a virtual machine deployment for implementing the virtual network function, e.g., in a manner designed to determine a resource configuration that meets certain performance metrics.

Various portions of the methods 300 and 400 may be performed by one or multiple computing devices. For example, one computing device may be responsible for iterating through various infrastructure configurations, while another computing device iterates through various resource configurations.

The foregoing disclosure describes a number of example implementations for determining virtual network function configurations. As detailed above, examples provide a mechanism for using iterative adjustments to various infrastructure and resource configurations to determine a virtual network function configuration that meets at least one performance metric for the virtual network function.

We claim:

1. A computing device for configuring virtual network functions, the computing device comprising:
   a hardware processor; and
   a data storage device storing instructions that, when executed by the hardware processor, cause the hardware processor to:
   receive a virtual network function specifying a particular function to be performed by at least one virtual machine;
   identify a particular performance metric for the virtual network function;
   determine, using the particular performance metric and a default resource configuration, a first infrastructure configuration specifying a value for each of a plurality of infrastructure options, each of the plurality of infrastructure options specifying a feature of the at least one virtual machine, by:
      using a test data set to perform the virtual network function on a test virtual machine, the test virtual machine using a default infrastructure configuration and having the default resource configuration;
      adjusting the default infrastructure configuration based on results of the performance of the virtual network function; and
   determine, using the particular performance metric and the first infrastructure configuration, a first resource configuration specifying a value for each of a plurality of virtualized hardware resources for the at least one virtual machine.

2. The computing device of claim 1, wherein the instructions further cause the hardware processor to:
   store, in a second data storage device, data indicating an association between the virtual network function, the first infrastructure configuration, and the first resource configuration.

3. The computing device of claim 1, wherein the first infrastructure configuration is determined by iteratively adjusting and testing the infrastructure options using a test data set and the default resource configuration for the at least one virtual machine.

4. The computing device of claim 1, wherein the first resource configuration is determined by iteratively adjusting and testing the resource options using a test data set and the first infrastructure configuration for the at least one virtual machine.

5. The computing device of claim 1, wherein the plurality of virtualized hardware resources include:
   a number of virtual machines;
   a number of data processors; and
   an amount of memory.

6. The computing device of claim 1, wherein the first resource configuration is determined by:
   using a test data set to perform the virtual network function on a test virtual machine, the test virtual machine using the first infrastructure configuration and having a default resource configuration; and
   adjusting the default resource configuration based on results of the performance of the virtual network function.

7. The computing device of claim 6, wherein the default resource configuration is adjusted by:
   determining that the results of the performance of the virtual network function indicate that a particular virtualized hardware resource of the plurality of virtualized hardware resources met a threshold measure of utilization; and
   adjusting the particular virtualized hardware resource in response to the determination.

8. The computing device of claim 1, wherein the virtual network function includes one of:
   a network firewall function;
   a network load balancing function;
   a network intrusion detection or prevention function; or
   a data center network function.

9. The computing device of claim 1, wherein the instructions further cause the hardware processor to:
   store, in a second data storage device, data indicating an association between the first infrastructure configuration, the first resource configuration, and a second virtual network function that is different from the virtual network function.

10. A method for configuring virtual network functions, implemented by a hardware processor, the method comprising:
    receiving a virtual network function specifying a particular function to be performed by at least one virtual machine;
    identifying a particular performance metric for the virtual network function;
    obtaining a test data set that includes input data for the virtual network function;
    determining, using the particular performance metric, the test data set, and a default resource configuration, a first infrastructure configuration specifying a value for each of a plurality of infrastructure options, each of the plurality of infrastructure options specifying a feature of the at least one virtual machine, by:
       using the test data set to perform the virtual network function on a test virtual machine using a default infrastructure configuration and the default resource configuration;
       adjusting the default infrastructure configuration based on results of the performance of the virtual network function; and
    determining, using the particular performance metric, the test data set, and the first infrastructure configuration, a first resource configuration specifying a value for each of a plurality of virtualized hardware resources for the at least one virtual machine.

11. The method of claim 10, further comprising:
    storing, in a data storage device, data indicating an association between the virtual network function, the first infrastructure configuration, and the first resource configuration.

12. The method of claim 10, wherein the first infrastructure configuration is determined by iteratively adjusting and testing the infrastructure options using the test data set and the default resource configuration for the at least one virtual machine.

13. The method of claim 10, wherein the first resource configuration is determined by iteratively adjusting and testing the resource options using the test data set and the first infrastructure configuration for the at least one virtual machine.

14. The method of claim 10, wherein the first resource configuration specifies a number of virtual machines.

15. The method of claim 10, wherein the first resource configuration is determined by:
   using the test data set to perform the virtual network function on a test virtual machine, the test virtual machine using the first infrastructure configuration and having a default resource configuration;
   adjusting the default resource configuration based on results of the performance of the virtual network function.

16. The method of claim 15, wherein the default resource configuration is adjusted by:
   determining that the results of the performance of the virtual network function indicate that a particular virtualized hardware resource of the plurality of virtualized hardware resources met a threshold measure of utilization; and
   adjusting the particular virtualized hardware resource allocation in response to the determination.

17. A non-transitory machine-readable storage medium encoded with instructions executable by a hardware processor of a computing device for configuring virtual network functions, the machine-readable storage medium comprising instructions to cause the hardware processor to:
   receive a virtual network function specifying a particular function to be performed by at least one virtual machine;
   identify a particular performance metric for the virtual network function;
   obtain a test data set that includes input data for the virtual network function;
   determine a first infrastructure configuration by iteratively adjusting and testing infrastructure configurations using the particular performance metric, a default resource configuration, and the test data set, each infrastructure configuration specifying a value for each of a plurality of infrastructure options, each of the plurality of infrastructure options specifying a feature of the at least one virtual machine, by
   using the test data set to perform the virtual network function on a test virtual machine, the test virtual machine using the default infrastructure configuration and having the default resource configuration;
   adjusting the default infrastructure configuration based on results of the performance of the virtual network function; and
   determine a first resource configuration by iteratively adjusting and testing resource configurations using the particular performance metric, the first infrastructure configuration, and the test data set, each resource configuration specifying a value for each of a plurality of virtualized hardware resources for the at least one virtual machine.

18. The storage medium of claim 17, wherein the instructions further cause the hardware processor to:
   store, in a second data storage device, data indicating an association between the virtual network function, the first infrastructure configuration, and the first resource configuration.

19. The storage medium of claim 17, wherein the first resource configuration is determined by:
   using the test data set to perform the virtual network function on a test virtual machine, the test virtual machine using the first infrastructure configuration and having a default resource configuration;
   adjusting the default resource configuration based on results of the performance of the virtual network function.

* * * * *